United States Patent [19]

Miyazaki

[11] Patent Number: 5,040,235
[45] Date of Patent: Aug. 13, 1991

[54] BATTERY POWERED MOTOR SPEED CONTROL APPARATUS

[75] Inventor: Hideto Miyazaki, Hyogo, Japan

[73] Assignee: Mitsubishi Denki Kabushiki Kaisha, Tokyo, Japan

[21] Appl. No.: 251,810

[22] Filed: Sep. 30, 1988

[30] Foreign Application Priority Data

Oct. 2, 1987 [JP] Japan .................. 62-247917

[51] Int. Cl.$^5$ .................................. G05B 5/00
[52] U.S. Cl. .................................. 388/815; 388/811; 388/915
[58] Field of Search .................. 318/301, 309–317, 318/326–327, 345, 138, 139; 388/809–815, 804–806, 819–822, 827, 830–833, 910, 915, 917

[56] References Cited

U.S. PATENT DOCUMENTS

| | | | |
|---|---|---|---|
| 3,710,216 | 1/1973 | Smith | 318/373 |
| 3,952,236 | 4/1976 | Hoover | 318/139 |
| 4,189,667 | 2/1980 | Boxer | 318/330 |
| 4,377,777 | 3/1983 | Asagi et al. | 318/51 |
| 4,591,768 | 5/1986 | Kudelski | 318/327 |
| 4,635,927 | 1/1987 | Shu | 318/341 |
| 4,739,230 | 4/1988 | Sonobe et al. | 318/301 |

FOREIGN PATENT DOCUMENTS 61-3349 1/1986 Japan.

Primary Examiner—William M. Shoop, Jr.
Assistant Examiner—David Martin
Attorney, Agent, or Firm—Burns, Doane, Swecker & Mathis

[57] ABSTRACT

In a power supply apparatus for driving a DC motor of a car cassette player, there is provided a switching regulator circuit for regulating a DC (direct current) input voltage to produce a desired DC output voltage; a motor driving circuit for driving a motor by receiving the DC output voltage of the switching regulator circuit; a sensor element for sensing a speed of the motor to output a sensor signal; a motor speed judging circuit for comprising a sensor signal from the sensor element with a reference signal to produce a judgement signal; and, a control voltage generating circuit for producing a control voltage based upon the judgement signal of the motor speed judgement circuit, whereby the DC output voltage of the switching regulator circuit is controlled in response to the control voltage.

3 Claims, 5 Drawing Sheets

BATTERY POWERED MOTOR SPEED CONTROL APPARATUS

BACKGROUND OF THE INVENTION

1. Field of the Invention

The present invention generally relates to a power supply apparatus for driving a DC motor. More specifically, the invention is directed to a power supply apparatus for driving, for instance, a motor of a cassette player built in an automobile, in which a power loss occurred in a series regulator is minimized and malfunction caused by such a heat loss of circuit components is prevented.

2. Description of the Related Art

Various types of power supply apparatus for driving the DC motor have been proposed in this technical field, for instance, Japanese KOKAI (Disclosure) patent application No. 61-3349 (1986) and U.S. Pat. No. 4,591,768 to Kudelski.

FIG. 1 is a block diagram of the conventional power supply apparatus for driving the DC motor. In FIG. 1, a DC (direct current) voltage $V_{IN}$ from a battery (not shown in detail) for a car power source is applied via a DC voltage input terminal 1 to a switching regulator 2. An output voltage $V_{out1}$ of this switching regulator 2 is applied to the subsequent series regulator 3. An output voltage $V_{out2}$ of the series regulator 3 is further applied to a motor drive circuit 4. This motor drive circuit 4 is used for, for instance, driving a motor 5 of a cassette player built in a vehicle. Adjacent to the motor 5, there is employed a sensing element 6 for sensing a rotation speed of the motor 5. A sensor output from the sensor element 6 is supplied to a motor speed judging circuit 7. In the motor speed judging circuit 7, a comparison is performed between the sensor output from the sensor element 6 and a predetermined reference signal. Depending upon the comparison result, a predetermined output signal is supplied from this motor speed judging circuit 7 to a control voltage generating circuit 8. A control voltage $V_{REG}$ derived from the control voltage generating circuit 8 is applied to the above-described series regulator 3, whereby the output voltage $V_{OUT2}$ from the series regulator 3 is properly controlled based upon this control voltage $V_{REG}$.

FIG. 2 is a schematic circuit diagram of a typical switching regulator. In FIG. 2, an emitter of a switching transistor $Q_1$ is connected to an input section (IN) of a power supply (not shown), and a diode D is connected between a collector of the switching transistor $Q_1$ and a ground. A base of this switching transistor $Q_1$ is connected via a resistor $R_1$ to a collector of a controlling transistor $Q_2$. A controlling signal is supplied via a resistor $R_2$ to a base of this controlling transistor $Q_2$, whereas an emitter thereof is grounded. Between a junction between the switching transistor $Q_1$ and diode D, and a ground line, a series circuit consisting of a filtering inductor "L" and a capacitor "C" is parallel-connected. Another junction between the inductor "L" and capacitor "C" is connected to an output section (OUT) of the above-described power supply.

FIG. 3 is a schematic circuit diagram of a typical series regulator. In FIG. 3, a collector of a transistor $Q_3$ is connected to the input section (IN) of the power supply whereas an emitter thereof is connected to the output section (OUT) of the power supply. A series circuit consisting of resistors $R_4$ and $R_5$ is connected between the output section (OUT) of the power supply and a ground line. A junction between these resistors $R_4$ and $R_5$ is connected to one terminal of a differential amplifier (DA) whereas a predetermined reference voltage "$E_{REF}$" is applied to the other input terminal thereof. This voltage "$E_{REF}$" corresponds to the above control voltage $V_{REF}$. An output terminal of this differential amplifier DA is connected via a resistor $R_3$ to a base of the transistor $Q_3$.

Then, operations of the conventional power supply apparatus for driving the motor will now be described with reference to FIG. 1. It is assumed that the motor 5 is being rotated while input power is supplied from this power supply apparatus. The rotation speed of this motor 5 is detected by the detector element 6, and the resultant signal of this detector element 6 is supplied to the motor speed judging circuit 7. In the motor speed judging circuit 7, a comparison is carried out between this resultant signal from the detector element 6 and the predetermined reference signal, and a predetermined output signal is supplied therefrom to the subsequent control voltage generating circuit 8 in accordance with the comparison result. As previously described, the control voltage $V_{REF}$ derived from this control voltage generating circuit 8 is added to the series regulator 3, whereby the output voltage $V_{OUT2}$ of the series regulator 3 is properly varied in response to this control voltage. Typically, this series regulator 3 shown in FIG. 3 employs the transistor $Q_3$ connected between the power source input unit (IN) and power source output unit (OUT), and this transistor $Q_3$ will cause a voltage drop in the emitter-to-collector path. As a consequence, an unnecessary power loss may be induced therein, and thus this transistor $Q_3$ is heated by herself, resulting in the malfunction of the circuitry.

As previously stated, the above-described conventional motor driving power supply apparatus may be applicable to the cassette player built in the vehicle. In such a car cassette player, generally speaking, the voltage to be applied to the motor 5 is low during the playback (reproducing) operation, i.e., the low speed mode, whereas this motor voltage becomes high during the fast forward (FF) operation, i.e., the high speed mode. Accordingly, in the prior art series regulator, the high voltage is continuously applied which is required during the above-described high speed mode. Then, during the low speed mode, the required voltage drop in this collector-to-emitter path of the transistor $Q_3$ must be set higher. As a result, the unwanted power loss will be increased, and thus, the occurrence of the malfunction of the circuit elements due to the higher heat problem will be emphasized.

In the conventional power supply apparatus for driving the DC motor with the above-described circuit arrangement, since the voltage control to the motor is effected in the series regulator stage, the above-explained unnecessary power consumption caused by the rotation of the motor is induced, and the circuit elements of the series regulator are heated due to such an unnecessary power consumption, resulting in the malfunction of the power supply apparatus.

The present invention has been made in an attempt to solve the above-described conventional problems, and has an object to provide a novel power supply apparatus for driving a DC motor, wherein the voltage control to the motor is carried out at the switching regulator stage.

Another object of the present invention is to provide a power supply apparatus for driving a DC motor, wherein unnecessary power consumption is minimized to avoid heat problems of circuit components.

SUMMARY OF THE INVENTION

To achieve the above-described objects of the invention, a power supply apparatus (100) for driving a motor comprising:

a switching regulator circuit (20) for regulating a DC (direct current) input voltage ($V_{IN}$) to produce a desired DC output voltage ($V_{OUT3}$);

a motor driving circuit (4) for driving a motor (5) by receiving the DC output voltage ) of the switching regulator circuit (20);

a sensor element (6) for sensing a speed of the motor (5) to output a sensor signal ($S_{MT}$);

a motor speed judging circuit (7) for comparing said sensor signal ($S_{MT}$) from the sensor element (6) with a reference signal to produce a judgement signal ($S_{COMP}$); and, a control voltage generating circuit (8) for producing a control voltage $V_{REG}$) based upon the judgement signal "$S_{COMP}$") of the motor speed judgement circuit (7), whereby the DC output voltage ($V_{OUT3}$ ) of the switching regulator circuit (20) is controlled in response to the control voltage ($V_{REG}$).

BRIEF DESCRIPTION OF THE DRAWINGS

These and other objects of the invention will become apparent with reference to the following specification and to the drawings, in which.

DETAILED DESCRIPTION OF THE PREFERRED EMBODIMENTS

Overall Circuit Arrangement

Figure 4:
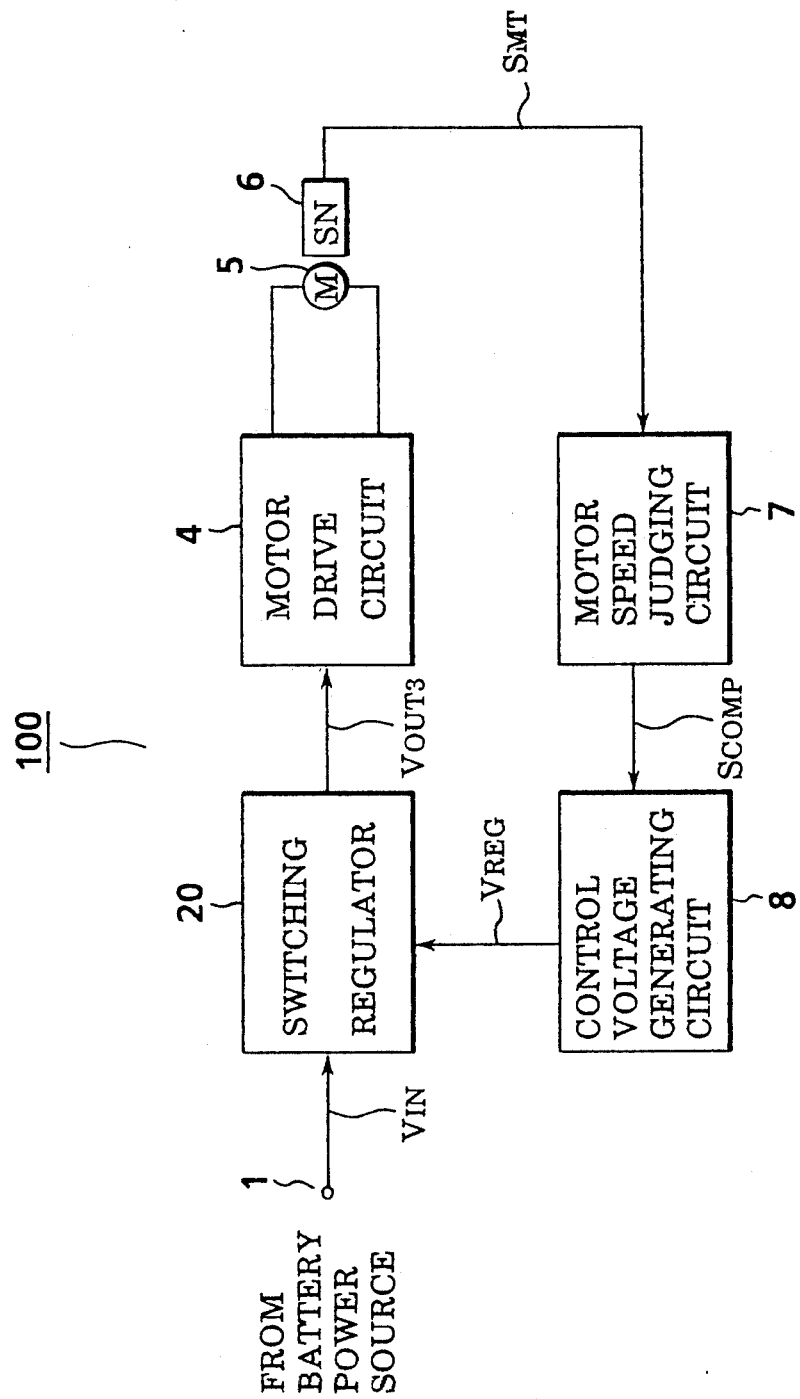
FIG. 4 is a schematic block diagram of a motor driving power supply apparatus according to a preferred embodiment of the invention.

Referring now to FIG. 4, a circuit block diagram of an overall circuit arrangement of a motor driving power supply apparatus 100 according to a preferred embodiment of the invention will now be described.

Figure 1:
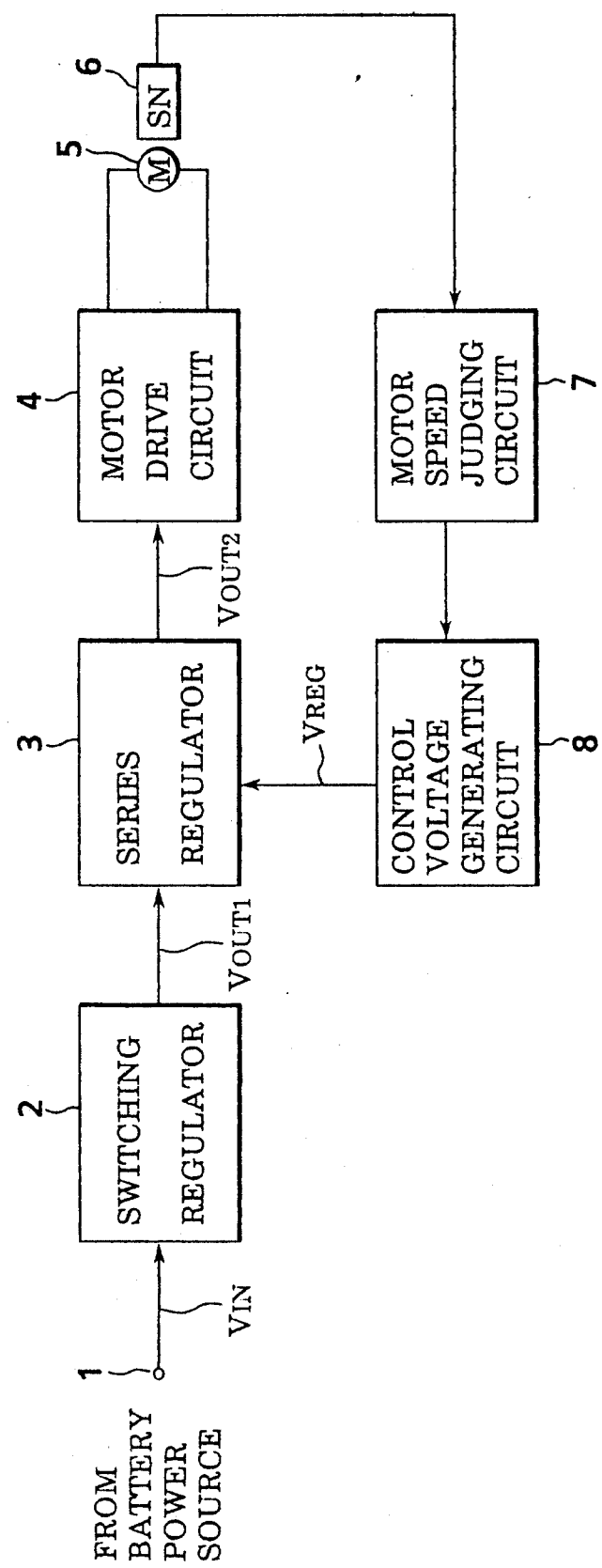
FIG. 1 is a schematic block diagram of the conventional motor driving power supply apparatus.

It should be noted that the same reference numerals shown in FIG. 1 will be employed as those for denoting the same circuits shown in FIG. 4.

In the circuit shown in FIG. 4, a DC voltage $V_{IN}$ derived from a car battery (not shown) as a power source of an automobile is applied to a switching regulator 20. This switching regulator 20 has the function of the conventional switching regulator 2 shown in FIG. 1 in addition to the featured functions of the invention (will be described later). A controlled output voltage $V_{OUT3}$ from the switching regulator 20 is applied to the motor drive circuit 4. This motor drive circuit 4 is similarly used for driving the DC motor 5 of the cassette player built in the automobile (not shown in detail). The motor speed sensor element 6 is positioned adjacent to the motor 5. A sensor signal "$S_{MT}$" from the sensor element 6 is supplied to the subsequent motor speed judging circuit 7. In the motor speed judging circuit 7, this sensor signal $S_{MT}$ is compared with a preset reference signal. As a result of this comparison, a predetermined output signal "$S_{COMP}$" derived from this motor speed judging circuit 7 is supplied to the control voltage generating circuit 8. The control voltage $V_{REG}$ of the control voltage generating circuit 8 is applied to the above-described switching regulator 20, so that the output voltage $V_{OUT3}$ derived from this switching regulator 20 is properly adjusted, or varied so as to establish the optimum motor driving condition.

Operations of Overall Circuit

Operations of the entire circuit arrangement of the motor driving power supply apparatus 100, according to the preferred embodiment of the invention, will now be described under the condition that the motor 5 is being rotated with the proper power supply. Upon detection of the motor speed of the motor 5, the sensor signal $S_{MT}$ is supplied to the rotation speed judging circuit 7 from the sensor element 6. Similarly, the preset reference signal is compared with this sensor signal $S_{MT}$ in the motor speed judging circuit 7. Thereafter, the resultant signal $S_{COMP}$ is supplied from the motor speed judging circuit 7 to the control voltage generating circuit 8. The control voltage $V_{REG}$ is accordingly generated in the control voltage generating circuit 8 and then is applied to the switching regulator 20 so as to control the output voltage $V_{OUT3}$ of the switching regulator 20.

Figure 2:
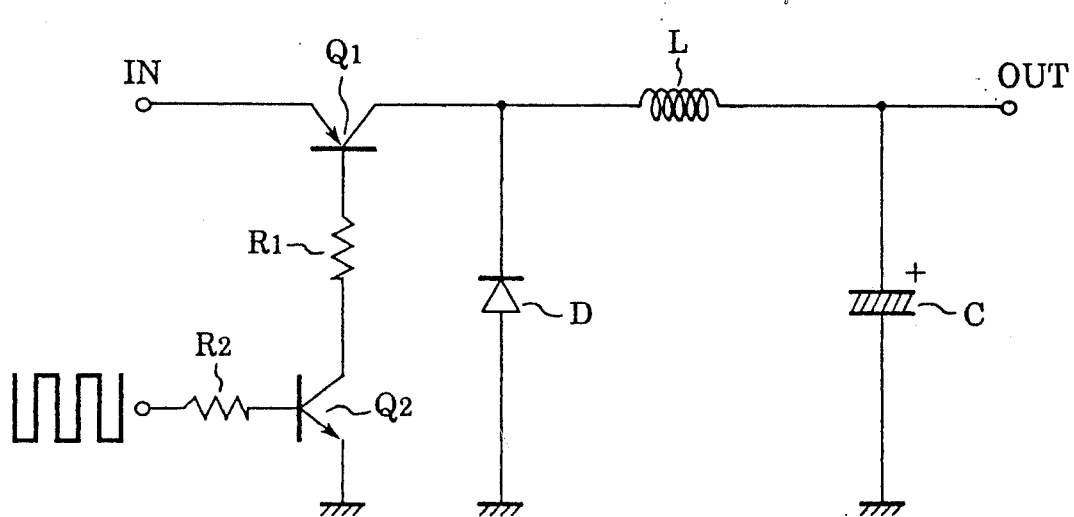
FIG. 2 is a circuit diagram of the typical switching regulator.
Figure 3:
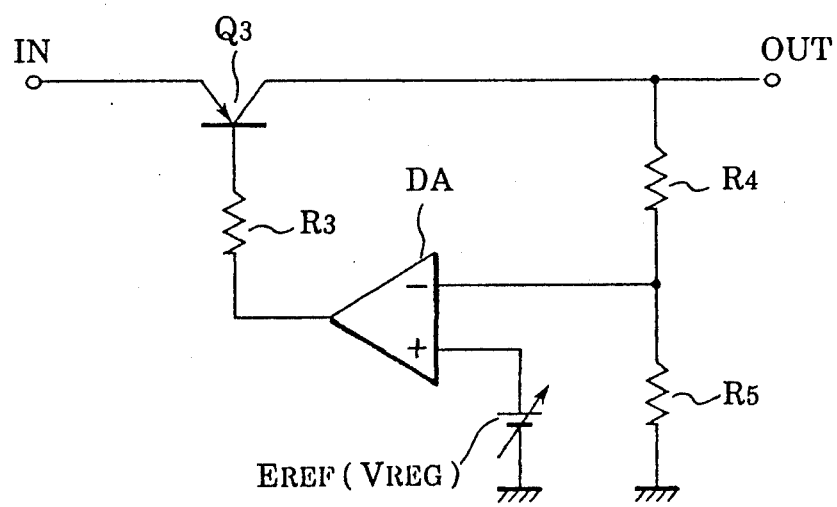
FIG. 3 is a circuit diagram of the typical series regulator.

While the output voltage $V_{OUT3}$ of this switching regulator 20 is varied in response to the control voltage $V_{REG}$ applied thereto, the switching transistor $Q_1$ in FIG. 2 is simply turned ON/OFF, so that this switching transistor does not function as the large voltage-drop element. As a consequence, the above-described conventional unwanted power loss, or undue power consumption can be considerably reduced. When this motor drive power supply apparatus 100 is utilized into a cassette player built in an automobile, since the output voltage $V_{OUT3}$ from the switching regulator 20 can be properly adjusted in accordance with the player operation modes, i.e., the high speed mode, and low speed mode, the power loss problem can be avoided.

Internal Circuit of Switching Regulator

Figure 5:
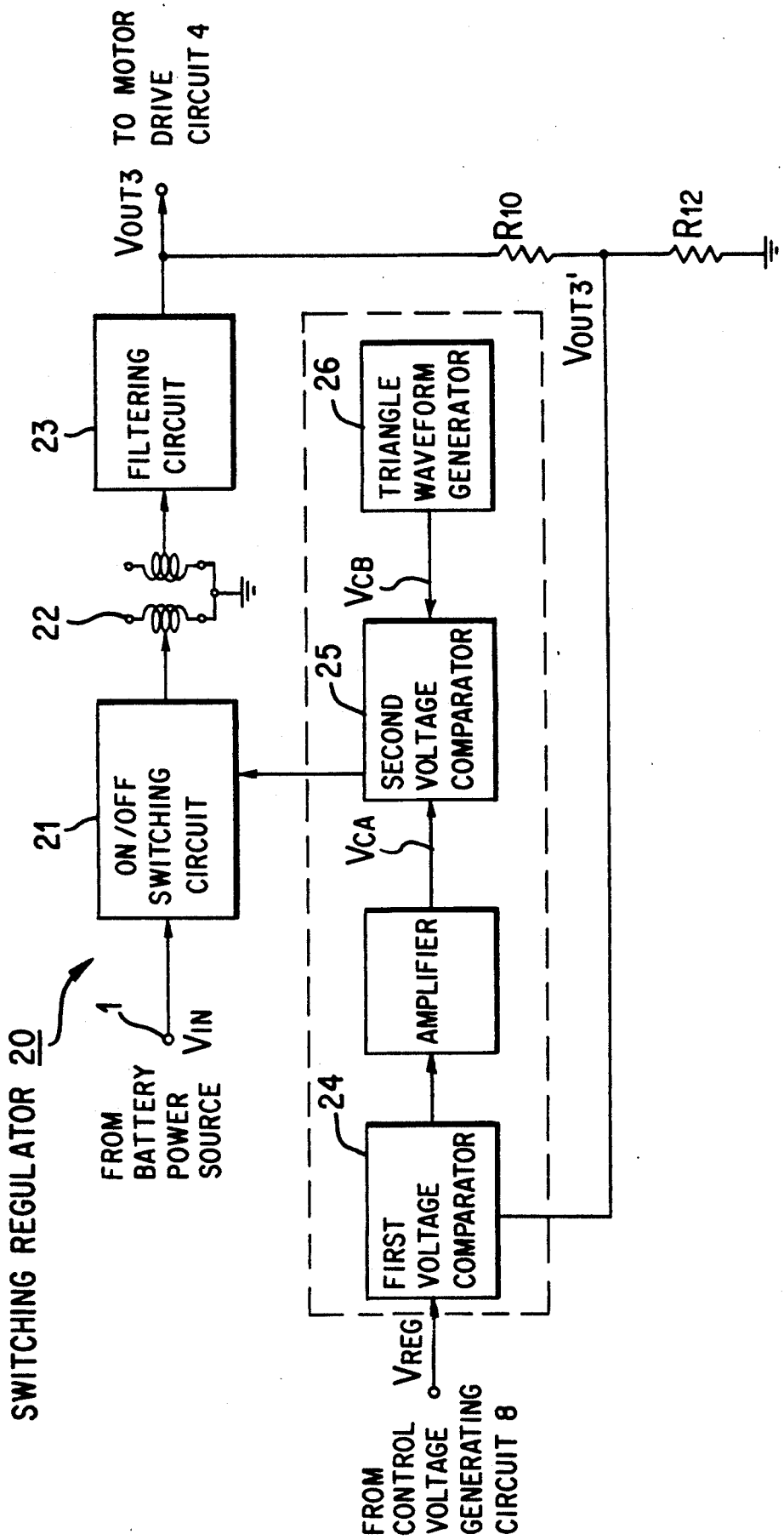
FIG. 5 is a block diagram of an internal circuit of the switching regulator 20 shown in FIG. 4.

In FIG. 5, there is shown an internal circuit of the switching regulator 20.

The input voltage $V_{IN}$ from the battery power source is applied to an ON/OFF switching circuit 21. An output of the switching circuit 21 is converted by a transformer 22 into a proper output voltage. The converted output voltage is then filtered in a filter circuit 23. The filter output voltage is applied as $V_{OUT3}$ to the motor drive circuit 4 of FIG. 4.

The output voltage $V_{OUT3}$ of the switching regulator 20 is subdivided by a series circuit of resistors R10 and R12 to produce a subdivided voltage $V_{OUT3'}$. In a first voltage comparator 24, this subdivided voltage $V_{OUT3'}$ is compared with the control voltage $V_{REG}$ supplied from the control voltage generating circuit 8. A comparison resultant signal $V_{CA}$ is output from this first voltage comparator 24 and transferred to a second voltage comparator 25. If required, this comparison resultant signal may be amplified before supplied to the second comparator 25. To the second comparator 25, on the other hand, another input signal, i.e., a triangle waveform signal $V_{CB}$ is supplied from a triangle waveform generator 26. If the first voltage signal $V_{CA}$ is smaller than the second voltage signal $V_{CB}$, the ON-/OFF switching circuit 21 is turned ON in response to an output from the second voltage comparator 25. Conversely, this switching circuit 21 is turned OFF under the condition of $V_{CA} > V_{CB}$.

Figure 6:
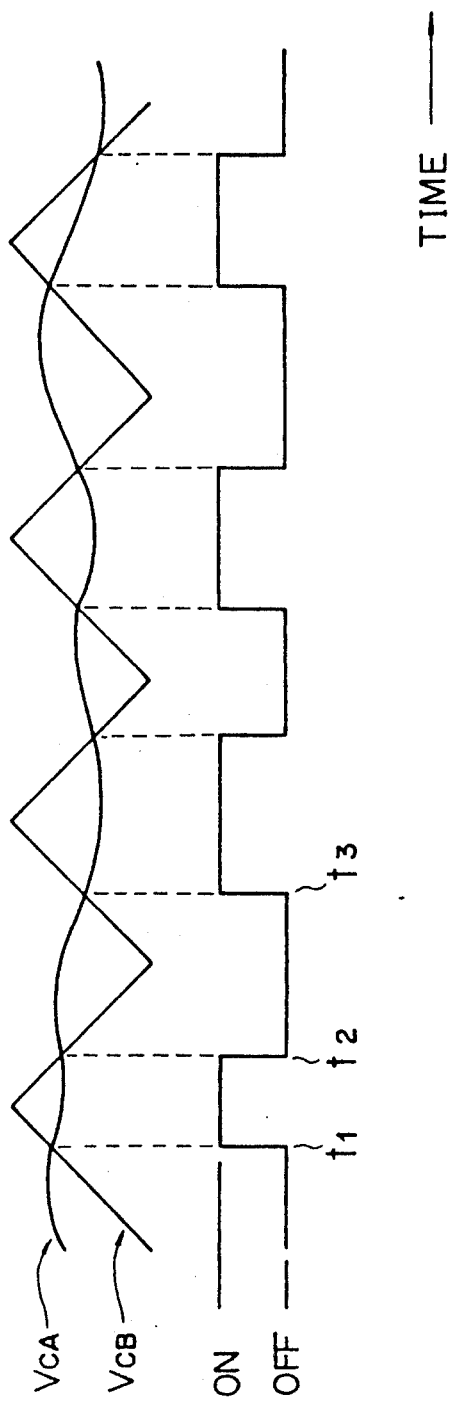
FIG. 6 is a waveform chart for illustrating the relationship between the first and second voltage signals $V_{CA}$ and $V_{CB}$.

This relationship between the first voltage signal $V_{CA}$ and second voltage signal $V_{CB}$ will be apparent from a waveform chart shown in FIG. 6. That is, for instance, as the first voltage signal $V_{CA}$ from the first voltage comparator 24 is lower than the second voltage signal $V_{CB}$ from the triangle waveform generator 26 during a time period "$t_1$" to "$t_2$", the switching circuit 21 is turned ON. Thereafter, during the subsequent time period "$t_2$" to "$t_3$", the first voltage signal $V_{CA}$ is higher than the second voltage signal $V_{CB}$ so that the switching circuit 21 is turned OFF.

When the output voltage $V_{OUT3}$ of the switching regulator 20 is lowered due to a heavy load, the subdivided voltage $V_{OUT3'}$ is also lowered. As a result, the first voltage signal $V_{CA}$ from the first voltage comparator 24 is similarly lowered. Then, the time period during which the first voltage signal $V_{CA}$ is lower than the second voltage signal $V_{CB}$ becomes longer, as compared with the above-described time period "$t_1$" to "$t_2$", for instance. As a consequence, the ON-time period of the switching circuit 21 becomes longer, so that the lowered output voltage $V_{OUT3}$ of the switching regulator 20 is increased, namely returned to the original output voltage. When the light load is connected to the switching regulator 20, the reverse operation is carried out so as to maintain the output voltage $V_{OUT3}$ constant.

It should be understood that since the control voltage $V_{REG}$ is a fixed voltage, or has a very low frequency compared with the frequency of the triangle waveform signal $V_{CB}$, an arbitrary fixed output voltage $V_{OUT3}$ can be obtained in the switching regulator 20 shown in FIG. 4.

As has been described in detail, the battery motor speed control apparatus 100 according to the invention employs a specific switching regulator 20 in the voltage control loop for controlling the output voltage $V_{OUT3}$ without causing any unwanted heat dissipation.

According to the invention, many modifications may be readily conceived. For instance, an amplifier may be interposed between the first and second voltage comparators 24 and 25. The circuit arrangements represented by a dot line of FIG. 5 may be fabricated by an integrated circuit.

What is claimed is:

1. A battery powered motor speed control apparatus, comprising:
    a switching regulator circuit including
        a first voltage comparator to output a first comparison signal,
        a reference waveform generator to generate a reference waveform signal,
        a second voltage comparator to compare the first comparison signal with the reference waveform signal to output a second comparison signal,
        a switching circuit to switch a DC (direct current) input from a battery source, a transformer for converting an output of said switching circuit into a proper output voltage, and
        a filtering circuit for smoothing out the converted output voltage to provide a desired controlled DC output voltage;
    a motor drive circuit for driving a DC motor by receiving the controlled DC output voltage provided by said switching regulator circuit;
    a sensor element for detecting a motor speed to provide a sensor signal;
    a motor speed judging circuit for comparing said sensor signal with a reference signal to provide a judgment signal; and
    a control voltage generator for generating a control voltage to be fed to said first voltage comparator for the control of said switching regulator circuit.

2. A battery powered motor speed control apparatus as defined in claim 1, wherein said switching regulator circuit further includes:
    a voltage divider consisting of series-connected resistors for subdividing the controlled DC output voltage of the filtering circuit to provide a subdivided voltage to be fed to said first voltage comparator, wherein the subdivided voltage is compared with the control voltage from said control voltage generating circuit to output the first comparison signal; and wherein
    the reference waveform generator generates a triangle waveform signal; and
    the second voltage comparator compares the first comparison signal with the triangle waveform signal for providing the second comparison signal to be used as a switching signal for the switching circuit, wherein ON/OFF durations of the second comparison signal are varied based on the result of the comparison of the first comparison signal and the triangle waveform signal.

3. A battery powered motor speed control apparatus as defined in claim 1, wherein said switching regulator circuit further includes:
    an amplifier interposed between said first and second voltage comparators for amplifying said first comparison signal to a predetermined signal level.

* * * * *